(12) United States Patent
Romanenko et al.

(10) Patent No.: US 10,489,634 B2
(45) Date of Patent: Nov. 26, 2019

(54) IMAGE PROCESSING

(71) Applicants: Apical Ltd, Cambridge (GB); University of Leicester, Leicester (GB)

(72) Inventors: Ilya Romanenko, Loughborough (GB); Alexander Gorban, Leicester (GB); Ivan Tyukin, Leicester (GB)

(73) Assignee: Apical Limited and University of Leicester, Cambridge and Leicester (GB)

( * ) Notice: Subject to any disclaimer, the term of this patent is extended or adjusted under 35 U.S.C. 154(b) by 81 days.

(21) Appl. No.: 15/716,220

(22) Filed: Sep. 26, 2017

(65) Prior Publication Data

US 2018/0089497 A1   Mar. 29, 2018

(30) Foreign Application Priority Data

Sep. 27, 2016 (GB) .................................. 1616402.2

(51) Int. Cl.
 *G06K 9/00* (2006.01)
 *G06K 9/32* (2006.01)

(52) U.S. Cl.
 CPC ....... *G06K 9/00221* (2013.01); *G06K 9/3241* (2013.01); *G06T 2207/20081* (2013.01); *G06T 2207/20084* (2013.01)

(58) Field of Classification Search
 None
 See application file for complete search history.

(56) References Cited

U.S. PATENT DOCUMENTS 9,280,742 B1 *  3/2016  Sargin ...................... G06N 5/04
9,443,198 B1 *  9/2016  Vitaladevuni .......... G06N 5/048

FOREIGN PATENT DOCUMENTS

WO        2013116865 A1     8/2013

OTHER PUBLICATIONS

Search Report dated Mar. 10, 2017 in related United Kingdom application GB 1616402.2 filed Sep. 27, 2016.

* cited by examiner

*Primary Examiner* — Delomia L Gilliard
(74) *Attorney, Agent, or Firm* — EIP US LLP

(57) ABSTRACT

A method including receiving an indication that a first classifier has identified that an image includes an object of a predetermined class of objects. Image data that relates to the image is processed using a second classifier with a first training state, which determines whether the image data includes the object of the predetermined class of objects. In response to the determining, data relating to the image data is transmitted to a remote system. Update data relating to the transmitted data is received from the remote system. The training state of the second classifier is updated to a second training state in response to the update data such that the second classifier with the second training state would make a different determination of whether future image data similar to the image data includes an object of the predetermined class of objects than the second classifier with the first training state.

20 Claims, 4 Drawing Sheets

IMAGE PROCESSING

CROSS-REFERENCE TO RELATED APPLICATIONS

This application claims priority to British Application No. GB 1616402.2, filed Sep. 27, 2016. The entire contents of the above-referenced patent application are hereby incorporated by reference.

BACKGROUND

Field of the Disclosure

Examples described herein relate to a method and various systems or apparatus, such as a processor system, a computer program, a computing device or a remote system, for processing an image.

Description of the Related Technology

It is known to use a classifier to identify an object of interest in an image. Typically, known classifiers suffer from the problem of "false positives", in which an image is incorrectly classified as containing the object of interest, whereas actually the object of interest is absent from the image.

It is desirable to provide a method of processing an image that is less susceptible to the identification of false positives or that can reduce the rate at which false positives are identified.

SUMMARY

According to a first aspect, a method of processing image data representing at least part of an image is provided. The method includes receiving an indication that a first classifier has identified that the image comprises an object of a predetermined class of objects. The method includes The method includes processing image data, that relates to the image that has been identified by the first classifier as comprising an object of a predetermined class of objects, using a second classifier with a first training state. The method includes determining, from the processing of the image data using the second classifier with the first training state, whether the image data comprises the object of the predetermined class of objects. The method includes in response to said determining step, transmitting data relating to the image data to a remote system. The method includes receiving update data from the remote system, the update data relating to the transmitted data. The method includes updating the training state of the second classifier to a second training state in response to the update data such that the second classifier with the second training state would make a different determination of whether future image data similar to the image data comprises an object of the predetermined class of objects than the second classifier with the first training state.

According to a second aspect, a processor system configured to process image data representing at least part of an image. Processing the image data includes receiving an indication that a first classifier has identified that the image comprises an object of a predetermined class of objects. Processing the image data includes processing image data, that relates to the image that has been identified by the first classifier as comprising an object of a predetermined class of objects, using a second classifier with a first training state. Processing the image data includes determining, from the processing of the image data using the second classifier with the first training state, whether the image data comprises the object of the predetermined class of objects. Processing the image data includes, in response to said determining step, transmitting data relating to the image data to a remote system. Processing the image data includes receiving update data from the remote system, the update data relating to the transmitted data. Processing the image data includes updating the training state of the second classifier to a second training state in response to the update data such that the second classifier with the second training state would make a different determination of whether future image data similar to the image data comprises an object of the predetermined class of objects than the second classifier with the first training state.

According to a third aspect, a remote system for processing data relating to image data representing at least part of an image is provided. A first classifier has identified that the image comprises an object of a predetermined class of objects. Image data relating to the image that has been identified by the first classifier as comprising an object of a predetermined class of objects having been processed using a second classifier with a first training state. The second classifier with the first training state has determined, from the processing of the image data, whether the image data comprises an object of the predetermined class of objects. The remote system includes a network interface to receive the data relating to the image data representing the at least part of the image from a computing device. The remote system includes at least one processor. The remote system includes storage coupled to the at least one processor. The storage includes computer program code configured to, when processed by the at least one processor, implement a third classifier. The third classifier is configured to process the received data to attempt to identify an incorrect determination of whether the image data comprises the object of the predetermined class of objects by the second classifier. The third classifier is configured to determine that the second classifier has incorrectly determined whether the image data comprises the object of the predetermined class of objects to generate the update data, the update data being indicative that the second classifier has incorrectly determined whether the image data comprises the object of the predetermined class of objects, wherein the network interface is further configured to send the update data to the computing device.

BRIEF DESCRIPTION OF THE DRAWINGS

Various features of the present disclosure will be apparent from the detailed description which follows, taken in conjunction with the accompanying drawings, which together illustrate, by way of example only, features of the present disclosure, and wherein.

DETAILED DESCRIPTION

Details of the method according to examples will become apparent from the following description, with reference to the FIGS. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

Examples described herein provide a method of processing image data representing at least part of an image. The image may be an image captured by an image capture device, such as a camera or a video camera. The image may be a static image or a frame of a video and may be in any suitable image format. Common formats of static images include the JPEG (Joint Photographic Experts Group) format, the GIF (Graphics Interchange Format), the BMP (Windows bitmap) format and the PNG (Portable Network Graphics) format. Typical formats for video data include the Audio Video Interleave (AVI) format, any of the MPEG (Motion Pictures Expert Group) formats such as MP4, MPEG-1 or MPEG-2, the AVCHD (Advanced Video Coding High Definition) format, or the DV or HDV formats (Digital Video or High-definition Digital Video). The image may include any graphical or visual content, for example text, graphics, pictures, and/or photographs.

Figure 1:
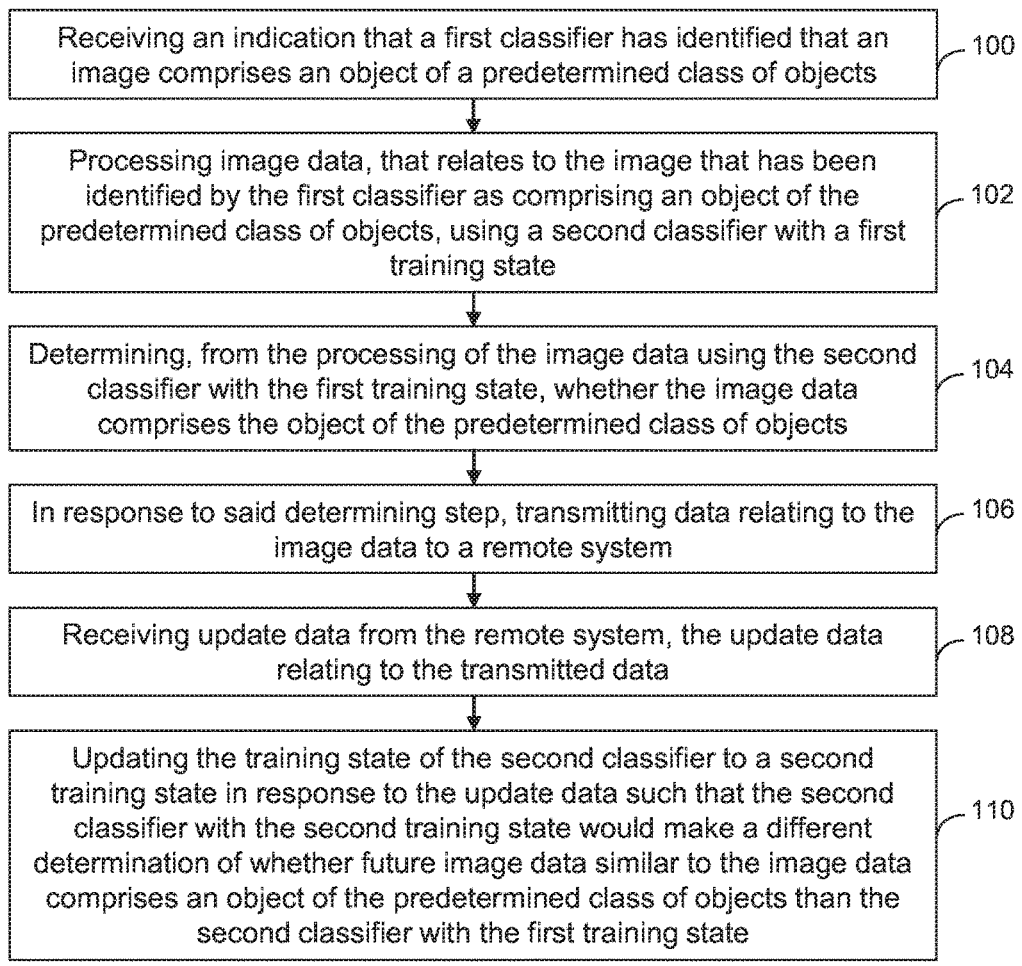
FIG. 1 is a flow diagram illustrating a method according to examples.

FIG. 1 is a flow diagram illustrating the method of processing the image according to examples. The method of FIG. 1 includes, at block 100, receiving an indication that a first classifier has identified that the image includes an object of a predetermined class of objects. The predetermined class of objects may be for example at least one of human faces or other objects characteristic of a human being. Thus, the method may include receiving an indication that the first classifier has identified that the image includes a human face or another part of a human body. Thus, the method may be used where it is desired to assess whether the image contains a human or a part of a human. In other examples, though, the predetermined class of objects may be different and may be animals, for example a particular breed or type of animal, or particular man-made items such as cars.

At block 102, image data relating to the image that has been identified by the first classifier as including an object of the predetermined class of objects is processed using a second classifier with a first training state. The method includes, at block 104, determining, from the processing of the image data using the second classifier with the first training state, whether the image data includes the object of the predetermined class of objects. Thus, blocks 102 and 104 may for example involve an assessment by the second classifier of whether, according to the second classifier with the first training state, the image does or does not truly include an object of the predetermined class of objects. For example, where the object is a human face, this may include the second classifier determining whether the first classifier has identified a "true positive": an image that has been correctly identified by the first classifier as containing a human face, or whether the first classifier has identified a "false positive": an image that has been incorrectly classified by the first classifier as containing a human face. For example, the first classifier may have mistaken the face of an animal for a human face and incorrectly determined that the image contains a human face.

Blocks 100, 102 and 104 may be implemented by an image capture device such as a camera or video camera. For example, the image capture device may be arranged to record images or video of a particular environment and process the images or video using the method described herein to determine whether the recorded images or video include a human. In this way, the image capture device can be used as part of a burglar or intruder detection system, for example, by looking for the presence of humans in an environment in which humans are expected to be absent, such as a secure location when an alarm system is activated. In other examples, blocks 100, 102 and 104 may be implemented by a television with processing capabilities such as a so-called "smart TV". For each, the television may include a camera or video camera to capture images of viewers of the TV. The method according to examples may be used to determine the presence, and for example location, of the viewers of the TV, for example so that characteristics or features of the content displayed by the TV can be tuned to the precise location of the viewers. For example, the sound levels of audio channels corresponding to various different speakers surrounding the viewers may be adjusted appropriately depending on the location of the viewers as determined based on the identification of humans in the images captured by the camera of the TV using the method according to examples. In yet further examples, the blocks 100, 102, 104 may be implemented by a computing device such as a mobile phone, for example a smartphone, a tablet, laptop or personal computer, a personal digital assistant, as well as various other electronic devices.

The method of FIG. 1 further includes, at block 106, in response to the determining step of block 104, transmitting data relating to the image data to a remote system. The remote system is for example a remote server system or a remote computing device or computing system, which may have greater computing power or resources than the resources available for implementing other parts of the method. For example, the remote system may have greater computing resources than a camera or video camera, which can for example be configured to implement blocks 100, 102 and 104 as explained above.

At block 108, update data relating to the transmitted data is received from the remote system. The update data may for example indicate that the second classifier with the first training state has incorrectly identified that the image includes an object of the predetermined class, such as a human face. In this situation, the update data may indicate that the transmitted data relates to a false positive identified by the remote system. Alternatively, the update data may indicate that the second classifier has correctly identified that the image includes an object of the predetermined class, in which case the update data may indicate that the transmitted data relates to a true positive identified by the remote system. Further details of the update data will be given below. In this way, the update data may provide feedback to the device for carrying out blocks 100, 102 and 104, which can allow the second classifier to be refined and improved appropriately, based on this feedback.

At block 110, the training state of the second classifier is updated to a second training state in response to the update data such that the second classifier with the second training state would make a different determination of whether future image data similar to the image data includes an object of the predetermined class of objects than the second classifier with the first training state.

Methods in accordance with FIG. 1 can therefore be used to update the training state of the second classifier, for example based on the update data. An accuracy of the second classifier may be improved based on this update. For example, in cases where both the first classifier and the second classifier falsely or incorrectly determine that the image includes an object of the predetermined class of objects, the training state of the second classifier can be updated so that, in future, the second classifier would correctly determine, for similar images, that the image does not include an object of the predetermined class of objects. This can reduce the false positive rate associated with the method, improving the accuracy of identifying particular objects.

Figure 2:
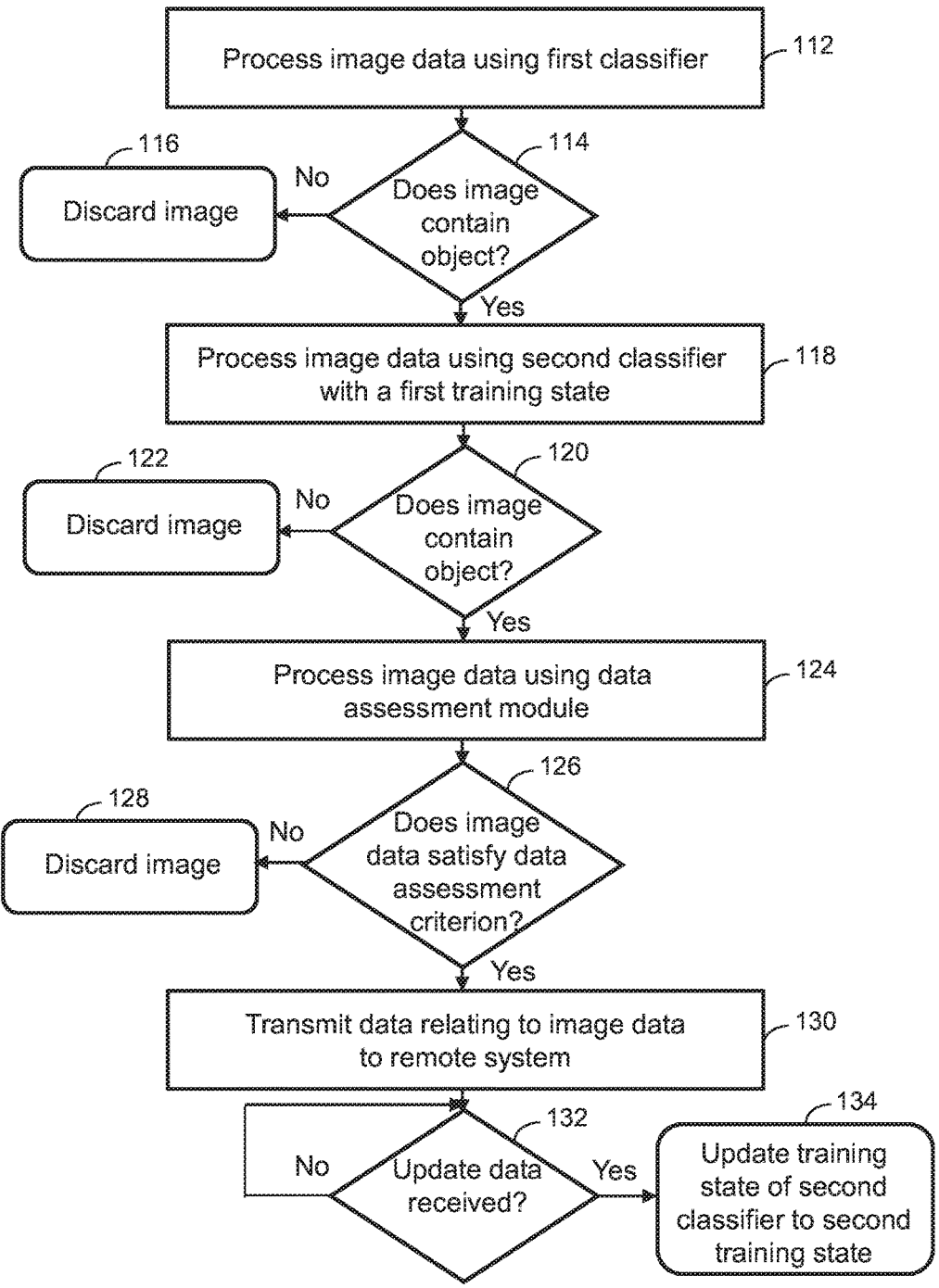
FIG. 2 is a flow diagram illustrating further examples of a method in accordance with the method of FIG. 1.

FIG. 2 is a further flow diagram illustrating further examples of a method in accordance with the method of FIG. 1. The method of FIG. 2 may be implemented on an image capture device, such as a camera or a video camera for example. In other examples, the processes illustrated in FIG. 2 may be carried out by a different electronic device than an image capture device, for example a computing device. Hardware and/or software of the image capture device or computing device may be used to implement the example method of FIG. 2. Hardware implementations may be relatively simple and cheap to manufacture and software implementations may allow further flexibility for alteration of the method if needed. For example, a processor system, for example including a microprocessor or chip, of an image capture device or computing device may be designed and manufactured to execute the method of FIG. 2. Further examples, however, relate to a computer program including software code adapted to perform the methods according to examples, such as the method of FIGS. 1 and/or 2.

In FIG. 2, the image data is processed at block 112 using the first classifier. The image data may be of any suitable format for processing. For example, the image data may include feature vectors derived from the at least part of the image. The feature vectors may for example correspond with descriptors that represent or characterize features of the image, for example features of particular keypoints or distinctive regions of the image. As the skilled person will appreciate, various different methods may be used to obtain suitable feature vectors. For example, the feature vectors may be based on or include one or more of a Histogram of Oriented Gradients (HoG), Haar-like features that are for example intuitively similar to Haar wavelets, Local Binary Patterns (LBP), a bag of words (which typically involves a histogram representation of an image based on image features), or vectors obtained from a neural network such as a convolutional neural network. Where the feature vectors are obtained from a neural network, the feature vectors may include the values of various nodes of the neural network for example concatenated to form a vector. For example, the image may be represented by the values of nodes in a layer of the neural network such as the output layer or the last or second to last fully connected layer of the neural network. The feature vectors may be normalized appropriately, for example using the L-2 norm (sometimes referred to as the Euclidean norm). The feature vectors may therefore be considered to correspond to points on a sphere in a multi-dimensional space.

The first classifier in examples is used to generate an indication of whether the first classifier has identified that the image includes an object of the predetermined class of objects, represented schematically by block 114 of FIG. 2. If the first classifier determines that the image does not include an object of the predetermined class of objects, the image is discarded at block 116, although in other examples, the image may be processed or handled differently upon a determination by the first classifier that it does not include such an object. By discarding images that do not contain objects of the predetermined class, the method may be used to filter obtained or captured images, to select solely those images that the system of FIG. 2 identifies as containing at least one object of the predetermined class. In other examples, methods similar to FIG. 2 may be executed by an image capture device or a computing device without processing the image data using the first classifier. Such methods may for example include receiving an indication of whether the first classifier has identified that the object includes an object of the predetermined class, but the processing of the image data using the first classifier may be performed elsewhere, for example on a separate electronic device.

If the first classifier determines that the image does include an object of the predetermined class of objects, the image data is processed using a second classifier with a first training state at block 118. The second classifier may be or include various different types of classifier. In examples, the second classifier uses a linear classification model, such as at least one of a support vector machine, or a Fisher discriminant. The second classifier can therefore be used to linearly separate points (e.g. corresponding with images that include an object of the predetermined class) from a set of other points (e.g. corresponding with images that do not include an object of the predetermined class). The inventors have surprisingly established that, in a high dimensional sample, every point can be linearly separated from the set of all other points with a high probability. The method according to examples aims to exploit this finding. However, in other examples, the second classifier may be non-linear.

If the second classifier determines that the image does not include an object of the predetermined class of objects, the image is discarded at block 122. As noted with reference to the first classifier, however, the image may be processed or handled differently upon a determination by the second classifier that it does not include such an object in other examples. In this way, the second classifier may be used to further filter positive results identified by the first classifier, removing false positives incorrectly identified by the first classifier as containing an object of the predetermined class. The second classifier can be used for example to reduce the false positive rate to an acceptable level such that the system of FIG. 2 can be used in real-world scenarios without outputting an excessive number of false positives. For example, the second classifier can be used to reduce the number of false positives from of the order of 100 a day to a few a day or fewer. In some cases, the second classifier may reduce the number of false positives to zero, substantially zero or practically zero. The number of positives falsely identified by the first classifier may depend on the nature of the image data, for example the feature vectors used to represent features of the image. For example, the first classifier may identify 10 false positives for 3000 true positives when processing image data including feature vectors based on HoG and may identify 2 false positives for 3000 true positives when the feature vectors are based on a convolutional neural network. Nevertheless, the number of false positives output by the first classifier may be non-negligible regardless of the nature of the image data. In these cases, the second classifier can be used, as explained above, to further reduce the number of false positives.

If the second classifier determines that the image does include an object of the predetermined class of objects, the image data in the example of FIG. 2 is processed using a data assessment module at block 124. The data assessment module in examples assesses whether the image data satisfies at least one predetermined data assessment criterion. The at least one predetermined data assessment criterion may include a tracking criterion for example where the image is a frame of a video. In such cases, particular points of the image, such as keypoints of the image, may be tracked over a plurality of frames, such as 3 to 5 consecutive frames, to determine whether the keypoints have traveled or moved a viable or physically sensible distance between frames. For example, the Kalman filter may be used for object tracking, as the skilled person will appreciate. The tracking criterion may be satisfied where it is determined that an object of an image, for example the object identified as belonging to the predetermined class by the first classifier and the second classifier, is moving relatively slowly and is therefore relatively static. The relative speed of movement for the object to satisfy the tracking criterion may depend on the nature of the predetermined class. For example, where the predetermined class is human beings, the tracking criterion may be satisfied for a slower identified speed of movement than where the predetermined class is vehicles. In other examples the at least one predetermined data assessment criterion may be a confidence criterion representing a confidence that the feature identified as being an object is indeed an object or a confidence that the object is not occluded or partly covered or obscured.

In the example of FIG. 2, the data assessment module is after the image data is processed using the second classifier with the first training state and before data relating to the image data is transmitted to the remote system, although in other examples the data assessment module may be before the image data is processed using the second classifier with the first training state or the data assessment module may be absent. If the at least one predetermined data assessment criterion is not satisfied, the image is discarded at block 128.

If the at least one predetermined data assessment criterion is satisfied, data relating to the image data is transmitted to the remote system at block 130. The transmitted data may be the same as the image data and may include feature vectors representing features or characteristics of the image. Alternatively, the transmitted data may differ from the image data, but may be derived from the image data for example. The processing of the transmitted data by the remote system, for example to generate update data, is described further below with reference to FIG. 3.

If update data is received from the remote system at block 132, the training state of the second classifier in the example of FIG. 2 is updated at block 134. For example, where the update data indicates that the image does not include an object of the predetermined class of objects (for example based on a determination by the third classifier of the remote system, which is described in further detail below), the training state of the second classifier may be updated so that the updated second classifier would, in future, correctly identify that the image or similar images do not include an object of the predetermined class.

The updating of the training state of the second classifier may include updating the training state of the second classifier using false positive training data including data derived from the image data. For example, the second classifier may be retrained using the data derived from the image data so that the retrained second classifier (with the second training state) would correctly identify that the image does not include an object of the predetermined class as explained above. The second classifier with the second training state may also identify that similar images also do not include an object of the predetermined class, whereas prior to updating the training state of the second classifier, the second classifier with the first training state may have otherwise incorrectly assessed that such similar images do include an object of the predetermined class.

The first training state of the second classifier, prior to updating the training state of the second classifier to the second training state at block 134, may be at least partly based on a plurality of sets of false positive training data each derived from image data representing at least part of a respective image of a plurality of images. For example, the methods described herein may be used to process a plurality of different images. The training state of the second classifier may be updated sequentially for each image that the remote system identifies relates to a false positive. For example, for each false positive, the second classifier may be retrained. In this way, the second classifier may be trained in a very specific way to identify and remove particular false positive images. This may be considered to be an overtraining of the second classifier, which is often considered undesirable in machine learning applications. However, in certain situations, such overtraining can be beneficial as it allows particular false positives to be very accurately learned and identified, so that they can be accurately removed in the future.

In order to overtrain the second classifier in this way, the method may include determining whether, for each newly identified false positive, the number of sets of false positive data are less than or equal to a predetermined threshold. For example, in response to receiving an indication that adding a further set of false positive training data to the plurality of sets of false positive training data will increase the number of sets of false positive training data in the plurality of sets of false positive training data beyond a predetermined threshold, the method may include discarding a set of false positive training data from the plurality of sets of false positive training data, for example such that the total number of sets is equal to or below the predetermined threshold, and adding a further set of false positive training data to the plurality of sets of false positive training data. The further set of false positive training data may include the data derived from the image data. Typically, the predetermined threshold is around 100 sets of false positive training data, and preferably between 50 sets and 150 sets, although other numbers of sets are possible, for example depending on a dimensionality of the feature vectors representing the false positive training data and/or the nature of the classification technique used for the second classifier.

In general, there may be a trade-off between the proportion of false positives removed by the second classifier and the number of true positives the second classifier incorrectly removes, due to an incorrect determination that these true positives are false positives. The number of sets of false positive training data used to train the second classifier, and for example the predetermined threshold, can be selected with this trade-off in mind, for example to achieve removal of a particular proportion of false positives without adversely or significantly affecting the detection rate of true positives. In some cases, the predetermined threshold may be chosen so that all, substantially all or a relatively high proportion such as more than 70%, 80%, 90% or even 95% of positives identified by the first classifier are correctly identified by the trained second classifier as false positives, without significantly reducing the true positive detection rate (for example, the rate at which the second classifier correctly determines that the first classifier correctly identified an image as containing an object of the predetermined class). For example, the number of sets of false positive training data for training the second classifier may be selected so that, on average, for each false positive correctly identified by the second classifier, less than two and preferably approximately one true positive is incorrectly determined to be a false positive. This may be considered to be a cost of false positive removal, in which false positive samples are removed in a ratio of 1:2 or preferably 1:1 to disappeared or removed incorrectly classified true positive samples. In contrast, the detection ratio for a known classifier may be worse than this. For example, for a known classifier, around 10 true positives are incorrectly identified as false positives for each correctly identified false positive, giving a ratio of 1:10 of removed false positives: disappeared true positives. Therefore, with this known classifier, a higher proportion of true positives may be incorrectly discarded or removed, which can adversely affect the performance of the classifier. Hence, as the method according to examples may provide for a higher true positive detection rate, the performance of the method according to examples may be better than the known classifier.

Overtraining the second classifier as explained may be considered counterintuitive. As noted above, a known machine learning algorithm is trained carefully to avoid overtraining. For example, the known machine learning algorithm may be trained to try to generalize as much as possible, in order to be able to effectively characterize previously unseen inputs. The method according to examples takes a different approach, however. In the method according to examples, the second classifier may be trained specifically to remove false positives that are the same as or similar to previously identified false positives. The second classifier may therefore be not to generalize, but instead to identify very particular false positives. It has nevertheless been found by the inventors that the method according to examples is effective at identifying false positives, for removal or otherwise.

In examples, updating the training state of the second classifier may alternatively or additionally include updating the training state of the second classifier using one or more sets of true positive training data. The true positive training data may relate to images that have been pre-provided to the system, that show particular expected images that do not include an object of the predetermined class of objects. In other examples, each of the sets of true positive training data may be derived from image data representing at least part of a respective image of a plurality of images, for example based on images that the second classifier or that the third classifier have determined do not include an object of the predetermined class.

Figures 3, 4:
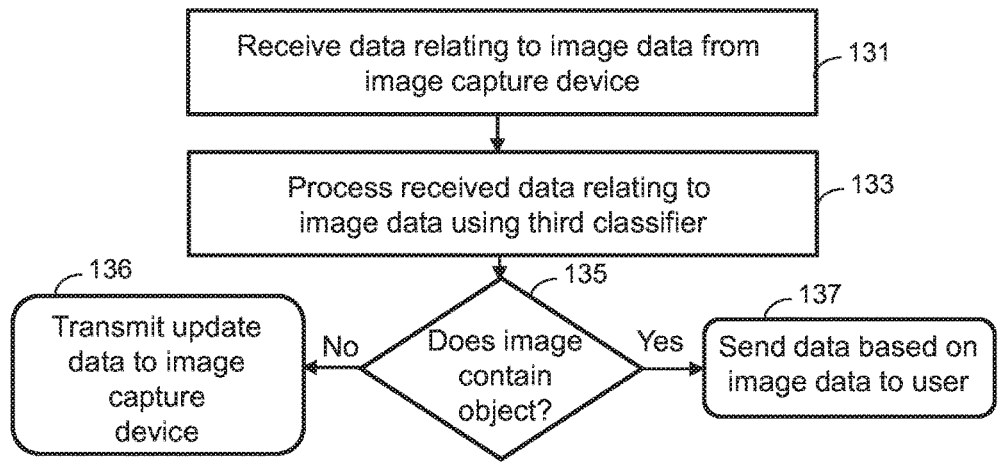
FIG. 3 is a flow diagram illustrating a method of processing an image using a remote system according to examples.
FIG. 4 is a schematic diagram showing an example of internal components of a remote system for use with the method according to examples.

FIG. 3 is a flow diagram illustrating a method of processing an image using a remote system according to examples. The remote system may for example be a remote system similar to or the same as the remote system described with reference to FIG. 4. In the example of FIG. 3, data relating to the image data is received from an image capture device at block 131. In other examples, the data relating to the image data may be received from another electronic device at block 131, such as a computing device.

In the example of FIG. 3, the received data relating to the image data is processed at block 133 using a third classifier. The third classifier may for example use a deep neural network or another machine learning algorithm such as a different type of neural network. In examples such as FIG. 3, the third classifier determines at block 135 whether the image includes the object. For example, the third classifier may attempt to identify an incorrect determination of whether the image data includes the object of the predetermined class of objects by the second classifier. In these examples, the third classifier may determine from the processing of the transmitted data using the third classifier that the second classifier has incorrectly determined whether the image data includes the object of the predetermined class of objects to generate the update data. The update data may be indicative that the second classifier has incorrectly determined whether the image data includes an object of the predetermined class of objects. Thus, the third classifier can for example be used as a yet further filter to identify whether the second classifier has identified any images as "false positive" images, for example images that the second classifier has incorrectly classified as containing an object of the predetermined class of objects. In other examples, the remote system may include other algorithms by which it can be determined whether the second classifier has falsely or incorrect determined that the image includes an object of the predetermined class. Regardless of how the determination is made by the remote system, in such examples, the update data may be indicative that the transmitted data relates to a false positive identified by the remote system. For example, the update data may indicate that both the first and the second classifiers have incorrectly identified that an object of the predetermined class is present but that the remote system has determined that the object is, in fact, not present in the image. The update data is transmitted to the image capture device at block 136 in this example, for example to provide an indication that the training state of the second classifier of the image capture device should be updated.

The third classifier is typically a more complex, and generally more accurate, classifier than the first classifier. For example, the first classifier may be a simple and "light" classifier that can be run quickly on collected images without consuming much power. In contrast, the third classifier may be more powerful than the first classifier, for example with a larger number of layers, and may take longer to classifier the transmitted data. The third classifier may have been trained using a larger number of training points than the first classifier. This may therefore improve the precision or accuracy with which the third classifier can identify whether images include objects of the predetermined class, compared with the first classifier.

In the example of FIG. 3, data based on the image data is sent to the user at block 137. For example, the image itself may be sent to the user. In other examples, though, other data may be sent to the user depending on the intended use of the system. For example, if the system is used as part of an intruder detection system, an alarm can be set off, a notification can be sent to a user or the emergency services can be called if a human is determined to be present, for example. As the consequences of a detection of a potential intruder may be disruptive, it is desirable to reduce the rate of false positive detection so that these consequences do not occur when no intruder is present. The method according to examples can be used to reduce the false positive rate sufficiently for use in such scenarios.

A suitable remote system for executing methods in accordance with FIG. 3 may or may not be a hardware-based or a solely hardware-based system. For example, the remote system and the third classifier of the remote system may be implemented using software, such as a computer program code.

FIG. 4 is a schematic diagram showing an example of internal components of a remote system 138 for use with the method according to examples. The remote system 138 includes a network interface 140 to receive, from an image capture device 142, data 144 relating to image data representing at least part of an image. Prior to receipt of the data 144 relating to the image data, a first classifier has identified that the image includes an object of a predetermined class of objects, the image data has been processed using a second classifier with a first training state and the second classifier has determined, from the processing of the image data, whether the image data includes an object of the predetermined class of objects. The network interface 140 may include software and/or hardware components, such as a virtual network interface, an Ethernet port, a software driver and/or communications stack interacting with network hardware. The image capture device 142 may be or include, amongst others, a camera or a video camera. The remote system 138 may include or be a computing device such as a television with processing capabilities, such as a so-called "smart TV", a mobile phone, for example a smartphone, a tablet, laptop or personal computer, a personal digital assistant, as well as various other electronic devices.

The remote system 138 further includes at least one processor 146. The at least one processor 146 in the example of FIG. 4 may be a microprocessor, a general purpose processor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

Storage 148 is coupled to the at least one processor 146. The storage 148 may include at least one of volatile memory, such as a Random Access Memory (RAM) and non-volatile memory, such as Read Only Memory (ROM) or a solid state drive (SSD) such as Flash memory. The storage 148 in examples may include further storage devices, for example magnetic, optical or tape media, compact disc (CD), digital versatile disc (DVD) or other data storage media. The storage 148 may be removable or non-removable from the remote system 138.

In the example of FIG. 4, the storage 148 includes computer program code configured to, when processed by the at least one processor 148, implement a third classifier 150. The third classifier 150 may be similar to or the same as the third classifier described above in examples, and may be configured to process the received data 144 to attempt to identify an incorrect determination of whether the image data includes an object of the predetermined class of objects by the second classifier and determine that the second classifier has incorrectly determined whether the image data includes the object of the predetermined class of objects to generate update data 152, which may also be stored in the storage 148. The update data 152 may be indicative that the second classifier has incorrectly determined whether the image data includes the object of the predetermined class of objects. In this example, the third classifier 150 is implemented as software. Alternatively, the third classifier may be implemented as hardware, or as a combination of hardware and software.

The network interface 140 of FIG. 4 is further configured to send the update data 152 to a computing device 156, for example for further processing. In other examples, the network interface 140 may be configured to send the update data or data based on the update data to the same device that the data based on the image data was received from, such as the image capture device 142.

The components of the remote system 138, which in the example of FIG. 4 is a computing device, are interconnected using a systems bus 156. This allows data to be transferred between the various components.

In further examples, the remote system may be configured to receive the data relating to the image data from a computing device or other electronic device and to send the update data to the computing device or other electronic device or to an image capture device.

Comparative Example

An example of the method according to examples described herein was implemented by the inventors and used to investigate whether the training state of the second classifier could be updated to eliminate all false positives identified by the first classifier while still maintaining the number of true positive detections by the first classifier. For example, it was investigated whether the second classifier could be trained to produce a so-called "trash model". This example is given merely to illustrate the principles of the method according to examples described herein, however the description and features of the example are not intended to be limiting.

For this example, a VGG-11 convolutional neural network was trained as the first classifier. The first classifier was trained on one object class: pedestrians, for example human beings walking rather than travelling in a vehicle. The VGG-11 convolutional neural network was chosen due to its relatively simple architecture and its classification ability. The VGG-11 convolutional neural network was trained over deeper 16 and 19 layer VGG neural networks due to hardware constraints and also due to the limited number of classes being trained on.

The first classifier was trained using a set of 114,000 positive pedestrian RGB images and a set of 375,000 negative non-pedestrian RGB images. Each of the images was resized to 128×128 pixels.

The momentum was set to 0.9 and a mini batch size of 32 was used. The initial learning rate was set to 0.00125 and this rate was reduced by a factor of 10 after 25 epochs and again after 50 epochs. Dropout regularization was used for the first two fully connected layers with a ratio of 0.5. Xavier initialization, which the skilled person will be aware of, was used to initialize the weights of the neural network as this was found to help the training converge more rapidly. The learning was halted after 75 epochs in order to avoid overfitting.

The second classifier (the "trash model") was then trained on frames of a video. First, a multi-scale sliding window approach was used on each video frame to provide image proposals that could be run through the trained first classifier. The multi-scale sliding window approach for example involves analyzing or processing image pixels within a fixed "window" at various different window positions and at various different window scales (e.g. different window sizes), to extract image features within the windows. These image proposals were re-sized to 128×128 pixels and classified by the trained first classifier as including a pedestrian or not including a pedestrian. Non-maximum suppression was then applied to the image proposals so as to remove multiple instances of the same object, for example corresponding to similar or overlapping but different window positions or scales, being identified as a positive. This can be used so that each pedestrian in the image is only identified or corresponded to one positive. Next, the results were compared to a ground truth, for example by using human input or passing the image proposals identified as containing a pedestrian through a trained third classifier such as the third classifier described above, to assess whether the image proposals truly did include a pedestrian. Any false positives were subsequently identified.

For each false positive and its respective set of detections before non-maximum suppression, for example each of the multiple positives that were associated with that respective false positive, the second to last fully connected layer of the VGG-11 convolutional neural network was extracted for each image and used as feature vectors. These extracted feature vectors had a dimension of 4096.

The entire positive training set was then run through the VGG-11 convolutional neural network and, as for the false positives, the second to last fully connected layer of the VGG-11 convolutional neural network was extracted for each image. The extracted feature vectors for both the false positives and the true positives were each normalized by the L-2 norm in preparation for building an SVM.

Finally, an SVM was trained, which in this example was done using the liblinear package, on these two sets of normalized VGG-11 convolutional neural network feature vectors. This trained SVM was considered to be the "trash model" or the second classifier for use in removing the false positives that it was trained on.

During this investigation, it was found that as the number of false positives being trained on increased, it was necessary to also increase the value of the C parameter, which indicates to the SVM how much it is desired to avoid misclassification or how strict the SVM should be when identifying whether an image falls in a particular class, to maintain a perfect separation of the positive and negative training points. This perfect separation allowed the number of true positives that could potentially be removed to be minimized while removing as many of the false positives as possible.

For testing, the trained SVM was placed at the end of a standard detection pipeline, for example as the second classifier. For all the positive detections produced by the VGG-11 convolutional neural network (the first classifier), the second to last fully connected layer of the VGG-11 convolutional neural network was extracted and run through the SVM trash model (second classifier). Any detection that gave a positive score from the SVM trash model was consequently removed as being a false positive.

This example pipeline was tested using three different videos to assess the creation of the trash model and its effectiveness at removing false positives. A new trash model was trained for each test video on all the false positives within that video and the video was then re-run with the results being filtered by the trash model. The first video was the INRIA test set including 288 frames and the second video was the LINTHESCHER sequence produced by ETHZ (the Swiss Federal Institute of Technology in Zurich) including 1208 frames. The final video sequence was one created by the inventors from the streets of Nottingham including 435 frames captured with an action camera. To increase the variance in this sequence, the camera was tilted by small angles randomly while filming. The performance of the example pipeline with the INRIA video, the LINTHESCHER video and the Nottingham video are shown in Tables 1, 2 and 3 respectively.

TABLE 1

Performance of the pipeline with and without trash model for the INRIA video.

|  | Without trash model | With trash model |
| --- | --- | --- |
| True positives | 490 | 489 |
| False positives | 31 | 0 |

TABLE 2

Performance of the pipeline with and without trash model for the LINTHESCHER video.

|  | Without trash model | With trash model |
| --- | --- | --- |
| True positives | 4288 | 4170 |
| False positives | 9 | 0 |

TABLE 3

Performance of the pipeline with and without trash model for the Nottingham video.

|  | Without trash model | With trash model |
| --- | --- | --- |
| True positives | 2896 | 2742 |
| False positives | 189 | 0 |

As can be seen from Tables 1, 2 and 3, the pipeline is effective at removing all false positives from each of the videos. These results demonstrate that it is possible build a trash model or second classifier that is capable of reliably filtering out a number of false positives whilst limiting the loss in the detection rate of true positives to an acceptable proportion.

Figure 5:
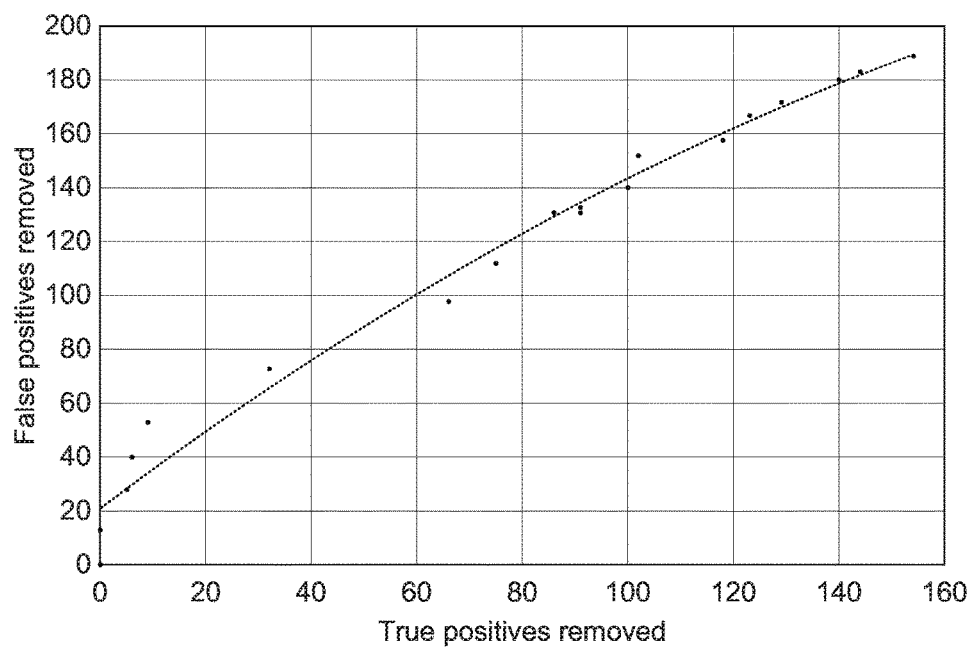
FIG. 5 is a graph illustrating the relationship between the number of true positives removed and the number of false positives removed with the method according to an example.

The Nottingham video was also used to build a trash model using varying numbers of false positives, to assess the effect of the number of false positives the trash model is trained on the number of true positives incorrectly removed. FIG. 5 is a graph illustrating the relationship between the number of true positives removed and the number of false positives removed, which corresponds with the number of false positives the trash model is trained on for the Nottingham video. As can be seen from FIG. 5, as the second classifier is trained to improve the removal of false positives, the number of true positives removed by the second classifier also increases. This may be considered conceptually to correspond to the second classifier requiring tighter and tighter criteria to be satisfied for an image to be identified as including an object of the predetermined class. As the criteria are tightened, some of the true positives fail to satisfy these criteria and are therefore incorrectly identified as not including an object of the predetermined class. The number of false positives used to train the second classifier may therefore be adjusted based on how important it is considered to be to identify all true positives, and how many false positives it is desired to remove. As can be seen in FIG. 5, this example illustrates that, for the Nottingham video, it is possible to remove up to 20 false positives at no cost to the true positive detections.

It was considered by the inventors that a similar pipeline but using a two-neuron classifier as the trash model (second classifier) rather than a linear SVM may improve the false positive removal. Thus, in other examples, a two-neuron classifier may be used as the second classifier.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

Further examples are described in accordance with the following numbered clauses:

Clause 1. A method of processing image data representing at least part of an image, the method comprising: receiving an indication that a first classifier has identified that the image comprises an object of a predetermined class of objects; processing image data, that relates to the image that has been identified by the first classifier as comprising an object of a predetermined class of objects, using a second classifier with a first training state; determining, from the processing of the image data using the second classifier with the first training state, whether the image data comprises the object of the predetermined class of objects; in response to said determining step, transmitting data relating to the image data to a remote system; receiving update data from the remote system, the update data relating to the transmitted data; and updating the training state of the second classifier to a second training state in response to the update data such that the second classifier with the second training state would make a different determination of whether future image data similar to the image data comprises an object of the predetermined class of objects than the second classifier with the first training state.

Clause 2: The method according to clause 1, comprising identifying, from the processing of the image data using the second classifier with the first training state, that the image data comprises the object of the predetermined class of objects, the update data being indicative that the transmitted data relates to a false positive identified by the remote system.

Clause 3: The method according to clause 2, wherein the updating the training state of the second classifier comprises updating the training state of the second classifier using false positive training data, the false positive training data comprising data derived from the image data.

Clause 4: The method according to any one of clauses 1 to 3, wherein the first training state of the second classifier is at least partly based on a plurality of sets of false positive training data each derived from image data representing at least part of a respective image of a plurality of images.

Clause 5: The method according to clause 4, comprising, in response to receiving an indication that adding a further set of false positive training data to the plurality of sets of false positive training data will increase the number of sets of false positive training data in the plurality of sets of false positive training data beyond a predetermined threshold: discarding a set of false positive training data from the plurality of sets of false positive training data; and adding a further set of false positive training data to the plurality of sets of false positive training data.

Clause 6: The method according to clause 5, wherein the further set of false positive training data comprises the data derived from the image data.

Clause 7: The method according to any one of clauses 1 to 6, wherein the updating the training state of the second classifier comprises updating the training state of the second classifier using one or more sets of true positive training data each derived from image data representing at least part of a respective image of a plurality of images.

Clause 8: The method according to any one of clauses 1 to 9, wherein the second classifier uses a linear classification model.

Clause 9: The method according to clause 8, wherein the linear classification model comprises at least one of: a support vector machine, a two-neuron classifier, or a Fisher discriminant.

Clause 10: The method according to any one of clauses 1 to 9, wherein the image data comprises feature vectors derived from the at least part of the image.

Clause 11: The method according to any one of clauses 1 to 10, comprising processing the image data using the first classifier to generate the indication that the first classifier has identified that the image comprises the object of the predetermined class of objects.

Clause 12: The method according to any one of clauses 1 to 11, wherein the remote system comprises a third classifier, the method further comprising: processing the transmitted data using the third classifier to attempt to identify an incorrect determination of whether the image data comprises the object of the predetermined class of objects by the second classifier; and determining from the processing of the transmitted data using the third classifier that the second classifier has incorrectly determined whether the image data comprises the object of the predetermined class of objects to generate the update data, the update data being indicative that the second classifier has incorrectly determined whether the image data comprises the object of the predetermined class of objects.

Clause 13: The method according to clause 12, wherein the third classifier uses a deep neural network.

Clause 14: The method according to any one of clauses 1 to 13, wherein the predetermined class of objects is at least one of: human faces or other objects characteristic of a human being.

Clause 15: The method according to any one of clauses 1 to 14, comprising determining that the image data satisfies at least one predetermined data assessment criterion before at least one of: the processing the image data using the second classifier with the first training state or the transmitting the data relating to the image data to the remote system.

Clause 16: The method according to any one of clauses 1 to 15, wherein the image data is derived from video data.

Clause 17: A processor system configured to perform the method according to any one of clauses 1 to 16.

Clause 18: A computer program comprising software code adapted to perform the method according to any one of clauses 1 to 16.

Clause 19: A remote system for processing data relating to image data representing at least part of an image, a first classifier having identified that the image comprises an object of a predetermined class of objects, image data relating to the image that has been identified by the first classifier as comprising an object of a predetermined class of objects having been processed using a second classifier with a first training state, the second classifier with the first training state having determined, from the processing of the image data, whether the image data comprises an object of the predetermined class of objects, the remote system comprising: a network interface to receive the data relating to the image data representing the at least part of the image from a computing device; at least one processor; and storage coupled to the at least one processor, wherein the storage comprises: computer program code configured to, when processed by the at least one processor, implement a third classifier, the third classifier being configured to: process the received data to attempt to identify an incorrect determination of whether the image data comprises the object of the predetermined class of objects by the second classifier; and determine that the second classifier has incorrectly determined whether the image data comprises the object of the predetermined class of objects to generate the update data, the update data being indicative that the second classifier has incorrectly determined whether the image data comprises the object of the predetermined class of objects, wherein the network interface is further configured to send the update data to the computing device.

What is claimed is:

1. A method comprising:
  processing image data, that relates to an image that has been identified by a first classifier as comprising an object of a predetermined class of objects, using a second classifier with a first training state;
  identifying, from the processing of the image data using the second classifier with the first training state, that the image data comprises the object of the predetermined class of objects;
  in response to said identifying step, transmitting data relating to the image data to a remote system;
  receiving update data from the remote system, the update data relating to the transmitted data, the update data being indicative that the transmitted data relates to a false positive identified by the remote system; and
  updating the training state of the second classifier to a second training state in response to the update data such that the second classifier with the second training state would make a different determination of whether future image data similar to the image data comprises an object of the predetermined class of objects than the second classifier with the first training state.

2. The method according to claim 1, wherein the updating the training state of the second classifier comprises updating the training state of the second classifier using false positive training data, the false positive training data comprising data derived from the image data.

3. The method according to claim 1, wherein the first training state of the second classifier is at least partly based on a plurality of sets of false positive training data each derived from image data representing at least part of a respective image of a plurality of images.

4. The method according to claim 3, comprising, in response to determining that adding a further set of false positive training data to the plurality of sets of false positive training data will increase the number of sets of false positive training data in the plurality of sets of false positive training data beyond a predetermined threshold:
  discarding a set of false positive training data from the plurality of sets of false positive training data; and
  adding a further set of false positive training data to the plurality of sets of false positive training data.

5. The method according to claim 4, wherein the further set of false positive training data comprises data derived from the image data.

6. The method according to claim 1, wherein the updating the training state of the second classifier comprises updating the training state of the second classifier using one or more sets of true positive training data each derived from image data representing at least part of a respective image of a plurality of images.

7. The method according to claim 1, wherein the second classifier uses a linear classification model.

8. The method according to claim 7, wherein the linear classification model comprises at least one of: a support vector machine, a two-neuron classifier, or a Fisher discriminant.

9. The method according to claim 1, wherein the image data comprises feature vectors derived from at least part of the image.

10. The method according to claim 1, comprising processing the image data using the first classifier to identify, using the first classifier, that the image comprises the object of the predetermined class of objects.

11. The method according to claim 1, wherein the remote system comprises a third classifier, the method further comprising:
  processing the transmitted data using the third classifier to attempt to identify an incorrect identification that the image data comprises the object of the predetermined class of objects by the second classifier; and
  determining from the processing of the transmitted data using the third classifier that the second classifier has incorrectly identified that the image data comprises the object of the predetermined class of objects to generate the update data, the update data being indicative that the second classifier has incorrectly determined that the image data comprises the object of the predetermined class of objects.

12. The method according to claim 11, wherein the third classifier uses a deep neural network.

13. The method according to claim 1, wherein the predetermined class of objects is at least one of: human faces or other objects characteristic of a human being.

14. The method according to claim 1, comprising determining that the image data satisfies at least one predetermined data assessment criterion before at least one of: the processing the image data using the second classifier with the first training state or the transmitting the data relating to the image data to the remote system.

15. The method according to claim 1, wherein the image data is derived from video data.

16. A processor system configured to:
  process image data, that relates to an image that has been identified by a first classifier as comprising an object of a predetermined class of objects, using a second classifier with a first training state;
  identify, from the processing of the image data using the second classifier with the first training state, that the image data comprises the object of the predetermined class of objects;
  in response to said identifying step, transmit data relating to the image data to a remote system;
  receive update data from the remote system, the update data relating to the transmitted data, the update data being indicative that the transmitted data relates to a false positive identified by the remote system; and
  update the training state of the second classifier to a second training state in response to the update data such that the second classifier with the second training state would make a different determination of whether future image data similar to the image data comprises an object of the predetermined class of objects than the second classifier with the first training state.

17. The processor system according to claim 16, wherein the first training state of the second classifier is at least partly based on a plurality of sets of false positive training data each derived from image data representing at least part of a respective image of a plurality of images.

18. The processor system according to claim 17, wherein the further set of false positive training data comprises data derived from the image data.

19. A remote system for processing data relating to image data representing at least part of an image, a first classifier having identified that the image comprises an object of a predetermined class of objects, the image data representing at least part of the image that has been identified by the first classifier as comprising an object of a predetermined class of objects having been processed using a second classifier with a first training state, the second classifier with the first training state having identified, from the processing of the image data, that the image data comprises an object of the predetermined class of objects, the remote system comprising:

a network interface to receive the data relating to the image data representing the at least part of the image from a computing device;

at least one processor; and storage coupled to the at least one processor, wherein the storage comprises:

computer program code configured to, when processed by the at least one processor, implement a third classifier, the third classifier being configured to:

process the received data to attempt to identify an incorrect determination that the image data comprises the object of the predetermined class of objects by the second classifier; and determine that the second classifier has incorrectly determined that the image data comprises the object of the predetermined class of objects to generate the update data, the update data being indicative that the received data relates to a false positive identified by the remote system, wherein the network interface is further configured to send the update data to the computing device.

20. The processor system according to claim 17, further configured to:

in response to determining that adding a further set of false positive training data to the plurality of sets of false positive training data will increase the number of sets of false positive training data in the plurality of sets of false positive training data beyond a predetermined threshold:

discard a set of false positive training data from the plurality of sets of false positive training data; and add a further set of false positive training data to the plurality of sets of false positive training data.

* * * * *